United States Patent

Adamski

(10) Patent No.: US 11,171,976 B2
(45) Date of Patent: Nov. 9, 2021

(54) CYBER MONITOR SEGMENTED PROCESSING FOR CONTROL SYSTEMS

(71) Applicant: United Technologies Corporation, Farmington, CT (US)

(72) Inventor: Paul A. Adamski, Westfield, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 216 days.

(21) Appl. No.: 16/150,342

(22) Filed: Oct. 3, 2018

(65) Prior Publication Data

US 2020/0112573 A1  Apr. 9, 2020

(51) Int. Cl.
*H04L 29/06* (2006.01)
*G06F 21/55* (2013.01)
*G06N 5/02* (2006.01)

(52) U.S. Cl.
CPC ........ *H04L 63/1425* (2013.01); *G06F 21/554* (2013.01); *G06N 5/025* (2013.01); *H04L 63/1416* (2013.01)

(58) Field of Classification Search
CPC ... H04L 63/1425; G06F 21/554; G06N 5/025; H06L 63/1416
USPC .......................................................... 726/23
See application file for complete search history.

(56) References Cited

U.S. PATENT DOCUMENTS

| | | | |
|---|---|---|---|
| 7,966,659 B1 | 6/2011 | Wilkinson et al. | |
| 8,949,668 B2 | 2/2015 | Hanks et al. | |
| 9,405,900 B2 | 8/2016 | Dixit et al. | |
| 9,537,884 B1* | 1/2017 | Raugas | H04L 63/1433 |
| 10,250,619 B1* | 4/2019 | Park | H04L 63/1416 |
| 10,689,129 B1* | 6/2020 | Nehmeh | B64D 47/00 |
| 2009/0265756 A1* | 10/2009 | Zhang | H04L 63/10 726/1 |
| 2014/0289852 A1* | 9/2014 | Evans | G06F 21/55 726/23 |
| 2015/0163242 A1* | 6/2015 | Laidlaw | G06N 7/023 726/22 |
| 2016/0098561 A1* | 4/2016 | Keller | G06F 21/567 726/24 |

(Continued)

OTHER PUBLICATIONS

CPAC: securing critical infrastructure with cyber-physical access control Sriharsha Etigowni, Dave (Jing) Tian, Grant Hernandez, Saman Zonouz, Kevin Butler ACSAC'16: Proceedings of the 32nd Annual Conference on Computer Security Applications. Dec. 2016, pp. 139-152 (Year: 2016).*

(Continued)

*Primary Examiner* — Samson B Lemma
*Assistant Examiner* — Mohammad S Shams
(74) *Attorney, Agent, or Firm* — Cantor Colburn LLP

(57) ABSTRACT

A cyber monitored control system includes a controller with a first processing resource operable to execute a control application for a controlled system. The cyber monitored control system also includes a cyber monitor with a second processing resource isolated from the first processing resource. The cyber monitor is operable to evaluate a plurality of inputs to the cyber monitored control system with respect to a cyber threat model, apply trending using the cyber threat model to distinguish between a fault and a cyber attack, and isolate one or more subsystems of the cyber monitored control system based on identifying the cyber attack.

18 Claims, 5 Drawing Sheets

(56) References Cited

U.S. PATENT DOCUMENTS

| | | | |
|---|---|---|---|
| 2016/0359895 A1* | 12/2016 | Chiu | G06Q 10/0635 |
| 2017/0063885 A1* | 3/2017 | Wardman | H04L 63/1416 |
| 2017/0214701 A1* | 7/2017 | Hasan | H04L 63/1491 |
| 2017/0237752 A1* | 8/2017 | Ganguly | H04L 63/1433 |
| | | | 726/25 |
| 2018/0082058 A1 | 3/2018 | Ferragut et al. | |
| 2018/0157838 A1* | 6/2018 | Bushey | H04L 63/1483 |
| 2018/0173879 A1 | 6/2018 | Shenfeld et al. | |
| 2018/0276375 A1 | 9/2018 | Arov et al. | |
| 2018/0284735 A1* | 10/2018 | Cella | G05B 19/41865 |
| 2018/0309795 A1* | 10/2018 | Ithal | H04L 63/0428 |
| 2018/0337932 A1* | 11/2018 | Juster | G06F 21/35 |
| 2019/0104138 A1* | 4/2019 | Storms | H04L 63/1425 |
| 2020/0028874 A1* | 1/2020 | Lam | H04L 63/1433 |

OTHER PUBLICATIONS

Building smart communities with cyber-physical systems Feng Xia, Jianhua Ma SCI'11: Proceedings of 1st international symposium on From digital footprints to social and community intelligence. Sep. 2011, pp. 1-6 (Year: 2011).*
EP Application No. 19201138.5 Extended EP Search Report dated Jan. 8, 2020, 8 pages.
EP Application No. 19201138.5 Office Action dated Apr. 23, 2021, 6 pages.

* cited by examiner

CYBER MONITOR SEGMENTED PROCESSING FOR CONTROL SYSTEMS

BACKGROUND

The subject matter disclosed herein generally relates to control systems and, more particularly, to a method and an apparatus for cyber monitor segmented processing for control systems.

Complex machines are composed of multiple systems that are intrinsically dependent. Health monitoring of complex machines typically focuses on systems or subsystems that are linked mechanically, electrically, or by a fluid. Health monitors typically test for expected failure modes, such as a failed open condition, a failed closed condition, a range failure, a rate failure, and the like. Cyber-attacks can be very sophisticated in that they may spoof sensors and communications. Such attacks may not be readily detectable by typical health monitoring systems of control systems of a complex machine, such as a vehicle.

BRIEF DESCRIPTION

According to one embodiment, a cyber monitored control system includes a controller with a first processing resource operable to execute a control application for a controlled system. The cyber monitored control system also includes a cyber monitor with a second processing resource isolated from the first processing resource. The cyber monitor is operable to evaluate a plurality of inputs to the cyber monitored control system with respect to a cyber threat model, apply trending using the cyber threat model to distinguish between a fault and a cyber attack, and isolate one or more subsystems of the cyber monitored control system based on identifying the cyber attack.

In addition to one or more of the features described above or below, or as an alternative, further embodiments may include where the inputs include one or more sensor inputs.

In addition to one or more of the features described above or below, or as an alternative, further embodiments may include where one or more of the inputs are derived from redundant sensors and related input/output signals.

In addition to one or more of the features described above or below, or as an alternative, further embodiments may include where the related input/output signals are received from a model of the controlled system configured to derive a model vector based on one or more input vectors, one or more output vectors, and one or more laws of physics associated with operation of the controlled system.

In addition to one or more of the features described above or below, or as an alternative, further embodiments may include where the trending identifies inconsistent behavior that does not match a known fault mode or an expected result from the model of the controlled system as a probable cyber attack.

In addition to one or more of the features described above or below, or as an alternative, further embodiments may include where the cyber threat model is trained using artificial intelligence to adapt as one or more cyber threats are characterized.

In addition to one or more of the features described above or below, or as an alternative, further embodiments may include where the cyber monitor is operable to compare a plurality of raw input data with conversion logic outputs of the controller to verify conversion logic performance.

In addition to one or more of the features described above or below, or as an alternative, further embodiments may include where the cyber monitor is operable to verify one or more update rates of the controller.

In addition to one or more of the features described above or below, or as an alternative, further embodiments may include where the cyber monitor is operable to monitor behavior of one or more control loops of the controller.

In addition to one or more of the features described above or below, or as an alternative, further embodiments may include where the cyber monitor is updateable through a cyber monitor update process including one or more security controls that are independent of an update process of the controller.

In addition to one or more of the features described above or below, or as an alternative, further embodiments may include where the cyber monitor is operable to track one or more communication anomalies and isolate a communication interface associated with the one or more communication anomalies based on identifying the cyber attack.

According to another embodiment, a method includes evaluating, by a cyber monitor, a plurality of inputs to a cyber monitored control system with respect to a cyber threat model. The cyber monitored control system includes a controller having a first processing resource operable to execute a control application for a controlled system. The cyber monitor includes a second processing resource isolated from the first processing resource. The cyber monitor applies trending using the cyber threat model to distinguish between a fault and a cyber attack. One or more subsystems of the cyber monitored control system are isolated based on identifying the cyber attack.

A technical effect of the apparatus, systems and methods is achieved by monitoring one or more control systems for cyber threats as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
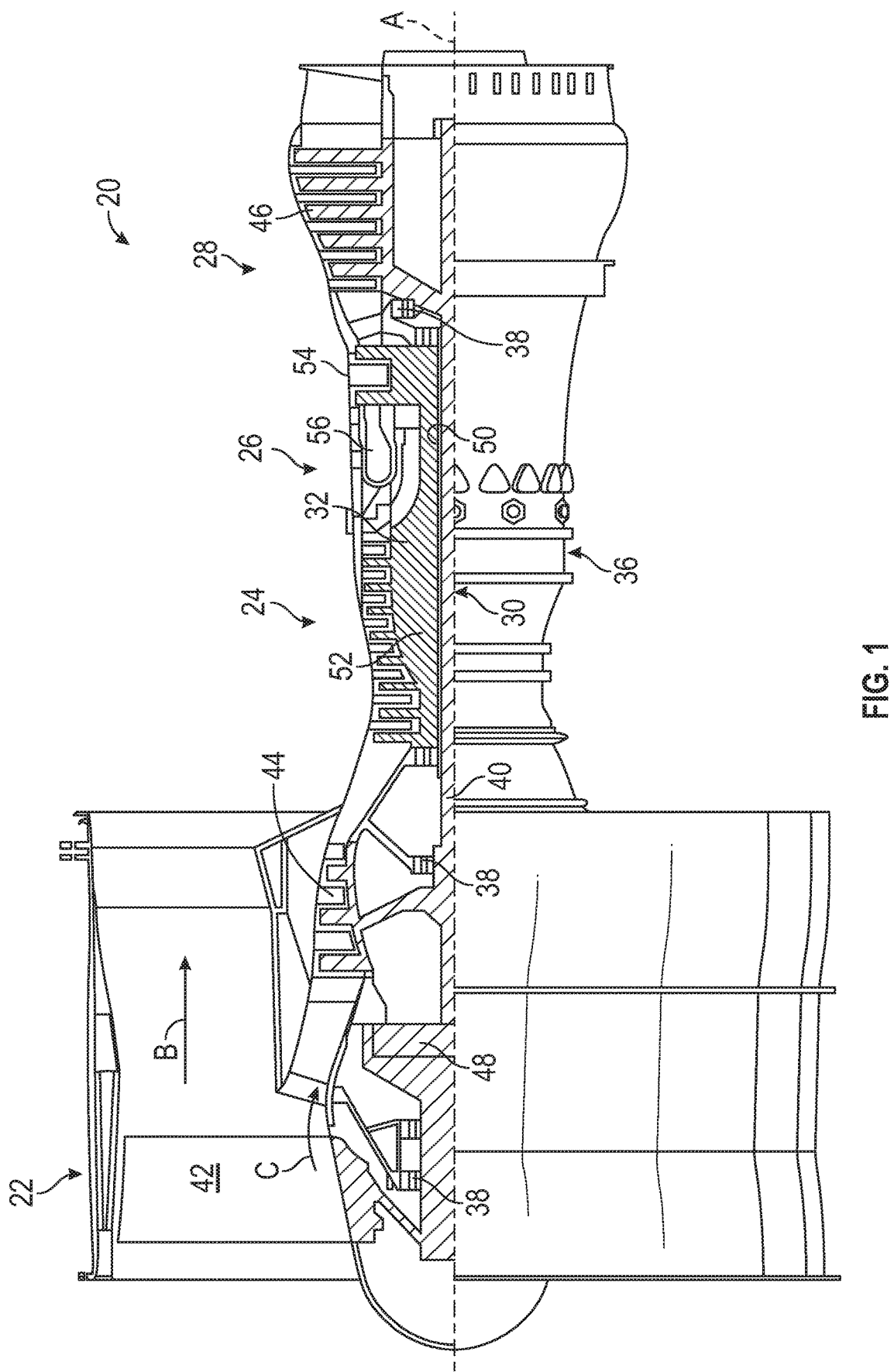
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{\wedge}0.5$. The "Low corrected fan tip speed" as disclosed herein according to one non-limiting embodiment is less than about 1150 ft/second (350.5 m/sec).

The gas turbine engine 20 is one type of complex machine that includes multiple subsystems that can be controlled. The gas turbine engine 20, as well as other types of vehicle systems, can be susceptible to cyber security attacks due to communication interfaces, digital inputs, and other factors. Cyber attacks may seek to disrupt operation of the gas turbine engine 20.

Figure 2:
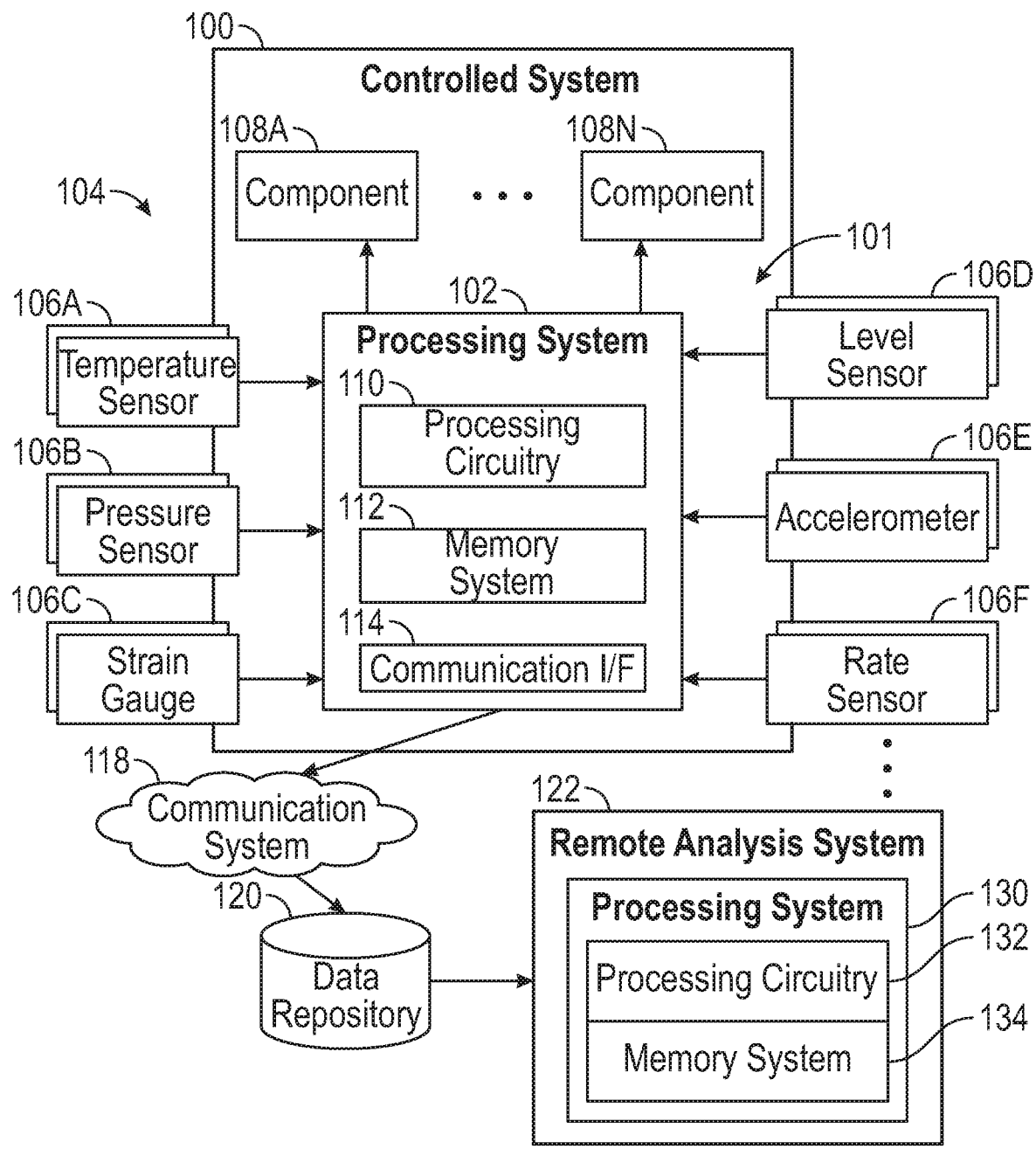
FIG. 2 is a block diagram of a monitored system, in accordance with an embodiment of the disclosure.

Referring now to the drawings, FIG. 2 illustrates a controlled system 100 that is controlled by a cyber monitored control system 101 that includes a processing system 102 coupled to a sensor system 104. The sensor system 104 includes a plurality of sensors 106 that are configured to collect diagnostic and operational data related to the controlled system 100. The controlled system 100 can be any type of machine or system including a plurality of components 108A-108N subject to detectable and predictable failure modes. For example, the controlled system 100 can be an engine, a vehicle, a heating, ventilating, and air conditioning (HVAC) system, an elevator system, industrial machinery, or the like. For purposes of explanation, embodiments are primarily described with respect to an engine system of an aircraft as the controlled system 100, such as the gas turbine engine 20 of FIG. 1. In the example of FIG. 2, the sensors 106 monitor a plurality of parameters of the controlled system 100, such as one or more temperature sensors 106A, pressure sensors 106B, strain gauges 106C, level sensors 106D, accelerometers 106E, rate sensors 106F, and the like. Examples of the components 108A-108N can include one or more torque motors, solenoids, and/or other effectors.

The processing system 102 can include processing circuitry 110 and a memory system 112 to store data and instructions that are executed by the processing circuitry 110. The executable instructions may be stored or organized in any manner and at any level of abstraction, such as in connection with a controlling and/or monitoring operation of the sensor system 104. The processing circuitry 110 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 112 may include random access memory (RAM), read only memory (ROM), or other electronic, optical, magnetic, or any other computer readable medium onto which is stored data and algorithms in a non-transitory form. The processing system 102 is operable to access sensor data from the sensor system 104 and drive outputs to control the components 108A-108N of the controlled system 100. The processing system 102 can also use a communication interface 114 to send and receive data values over a communication system 118 to a data repository 120 and/or other locations, such as a vehicle system bus, vehicle management computer, and the like. The processing system 102 can include other interfaces (not depicted), such as various outputs, wireless communication interfaces, power management, and the like.

The data repository 120 can be subdivided or distributed between multiple databases and/or locations. In embodiments, the data repository 120 is accessible by an analysis system 122. The analysis system 122 can be in close physical proximity to the controlled system 100 or may be remotely located at a greater distance. The analysis system 122 may also interface with a number of other instances of the data repository 120 associated with other instances of the controlled system 100 (e.g., a fleet of controlled systems 100). Similar to the cyber monitored control system 101, the analysis system 122 includes a processing system 130 with processing circuitry 132 and a memory system 134 operable to hold data and instructions executable by the processing circuitry 132. In some embodiments, the processing system 130 is a workstation, a mainframe, a personal computer, a tablet computer, a mobile device, or other computing system configured as disclosed herein, while the processing system 102 may be an embedded computing system of the controlled system 100 operable to perform real-time data acquisition and analysis. Further, the processing system 130 can be distributed between multiple computing devices. The analysis system 122 can collect cyber security data across multiple instances of the control system 100 to assist in training and cyber security rule development.

Figure 3:
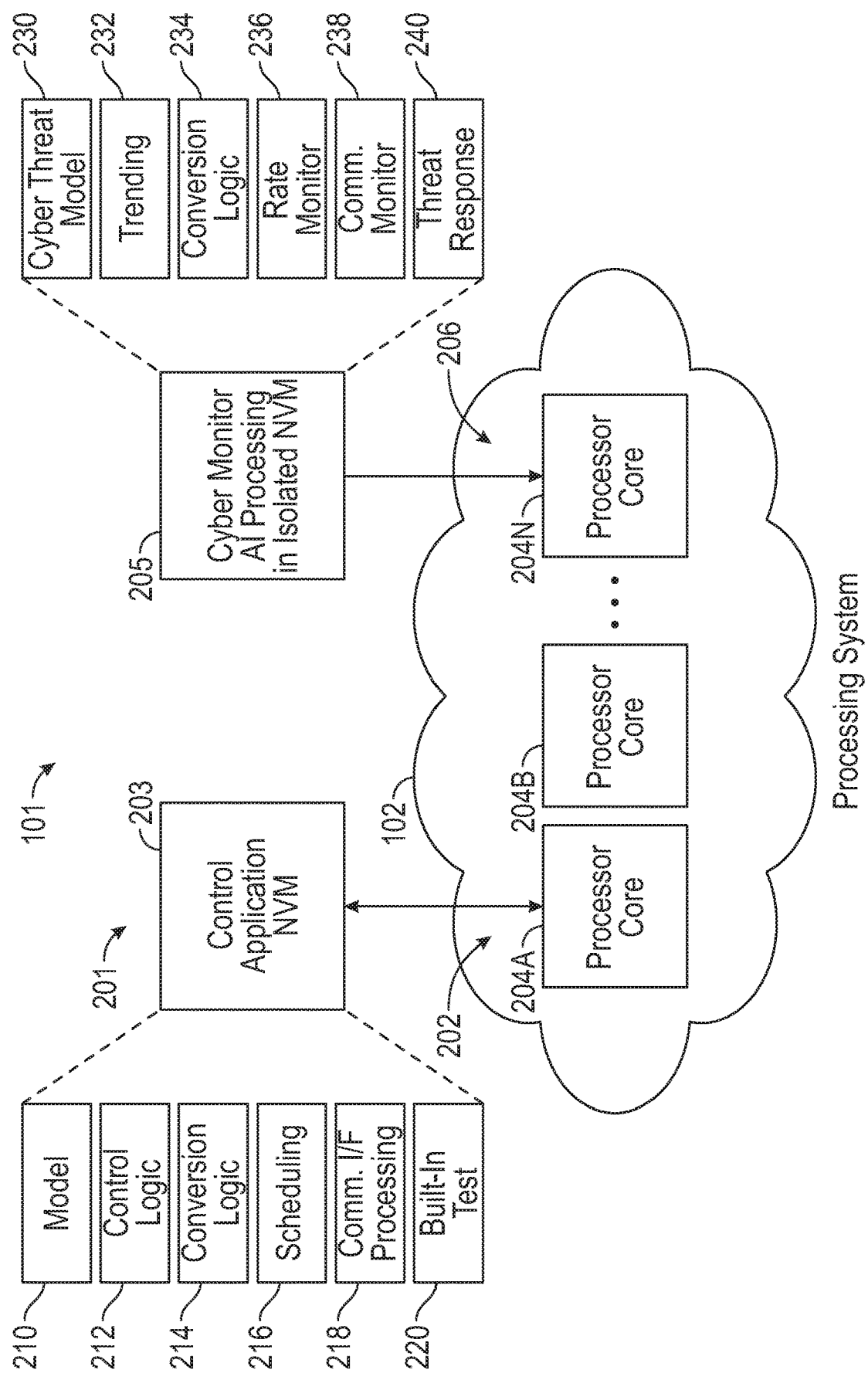
FIG. 3 is a block diagram of partitioning for cyber monitoring, in accordance with an embodiment of the disclosure.

Referring now to FIG. 3, an example of the cyber monitored control system 101 of FIG. 2 is depicted in greater detail, where the processing system 102 includes a plurality of processor cores 204A, 204B, . . . , 204N. Processing resources, such as the processor cores 204A-204N, of the cyber monitored control system 101 may be distributed between a controller 201 including a first processing resource 202 operable to execute a control application 203 for the controlled system 100 of FIG. 2. The first processing resource 202 can include, for instance, processor core 204A and a section of nonvolatile memory (NVM) of the memory system 112 of FIG. 2. A cyber monitor 205 can include a second processing resource 206 isolated from the first processing resource 202. The second processing resource 206 can include, for instance, processor core 204N and a section of nonvolatile memory (NVM) of the memory system 112 of FIG. 2. Alternatively, the first and second processing resources 202, 206 can be separated as independent processors or a processor/circuitry split, such as a microcontroller and a gate array. The separation between the controller 201 and cyber monitor 205 helps to ensure that a cyber attack on the controller 201 does not spread to the cyber monitor 205.

The cyber monitor 205 may be updateable through a cyber monitor update process including one or more security controls that are independent of an update process of the controller 201. For instance, security controls can include the use of different and unique software keys, input sequences, hardware elements, discrete switches, and the like, such that a unique process is applied for updates made to the cyber monitor 205, e.g., through a boot loader or bus loader, as compared to the update process for the controller 201.

The controller 201 can implement a number of control related functions as part of or in support of the control application 203. For example, the controller 201 may implement a model 210 to support decisions by control logic 212. Conversion logic 214 can convert raw input data from the sensor system 104 of FIG. 1 into conversion logic outputs, such as engineering unit data. Scheduling 216 can control updates of outputs to the components 108A-108N of FIG. 1 and acquisition of data from various sources such as from the sensor system 104. Communication interface process 218 can control message processing through the communication interface 114 of FIG. 1. Built-in test 220 can execute diagnostics to detect problems within the processing system 102 and other inputs/outputs.

The cyber monitor 205 can include artificial intelligence processing to learn and adapt a cyber threat model 230. The cyber threat model 230 can include a plurality of rules and/or characteristics that are indicative of a cyber attack, such as spoofing of a sensor, spoofing a component of the communication system 118 of FIG. 2, a denial of service attack, patterns of attempts to access protected areas of the memory system 112, patterns of attempts to trigger a reset of the processing system 102, and other such cyber security threats. The cyber monitor 205 can include trending 232 to identify inconsistent behavior that does not match a known fault mode or an expected result from the model 210 of the controlled system 100 as a probable cyber attack. The cyber monitor 205 can include a conversion monitor 234 operable to compare a plurality of raw input data with conversion logic 214 outputs of the controller 201 to verify conversion logic 214 performance. The cyber monitor 205 may also include a rate monitor 236 operable to verify one or more update rates of the controller 201. The cyber monitor 205 can further include a communication monitor 238 operable to track one or more communication anomalies and isolate a communication interface 114 associated with the one or more communication anomalies based on identifying the cyber attack. Communication anomalies can include a pattern of faults that is indicative of a deliberate attack through the communication system 118, for example. A threat response 240 of the cyber monitor 205 can include isolating one or more subsystems of the cyber monitored control system 101 based on identifying the cyber attack, for instance, by no longer accepting input from a suspect sensor, a suspect communication bus, or other source deemed subject to a cyber attack. While expected fault conditions may be recoverable during operation, for instance, due to noise or a transient event, an element identified as subject to a cyber attack may be blocked from future use by the controller 201 until an inspection is performed or a software update is installed.

Figure 4:
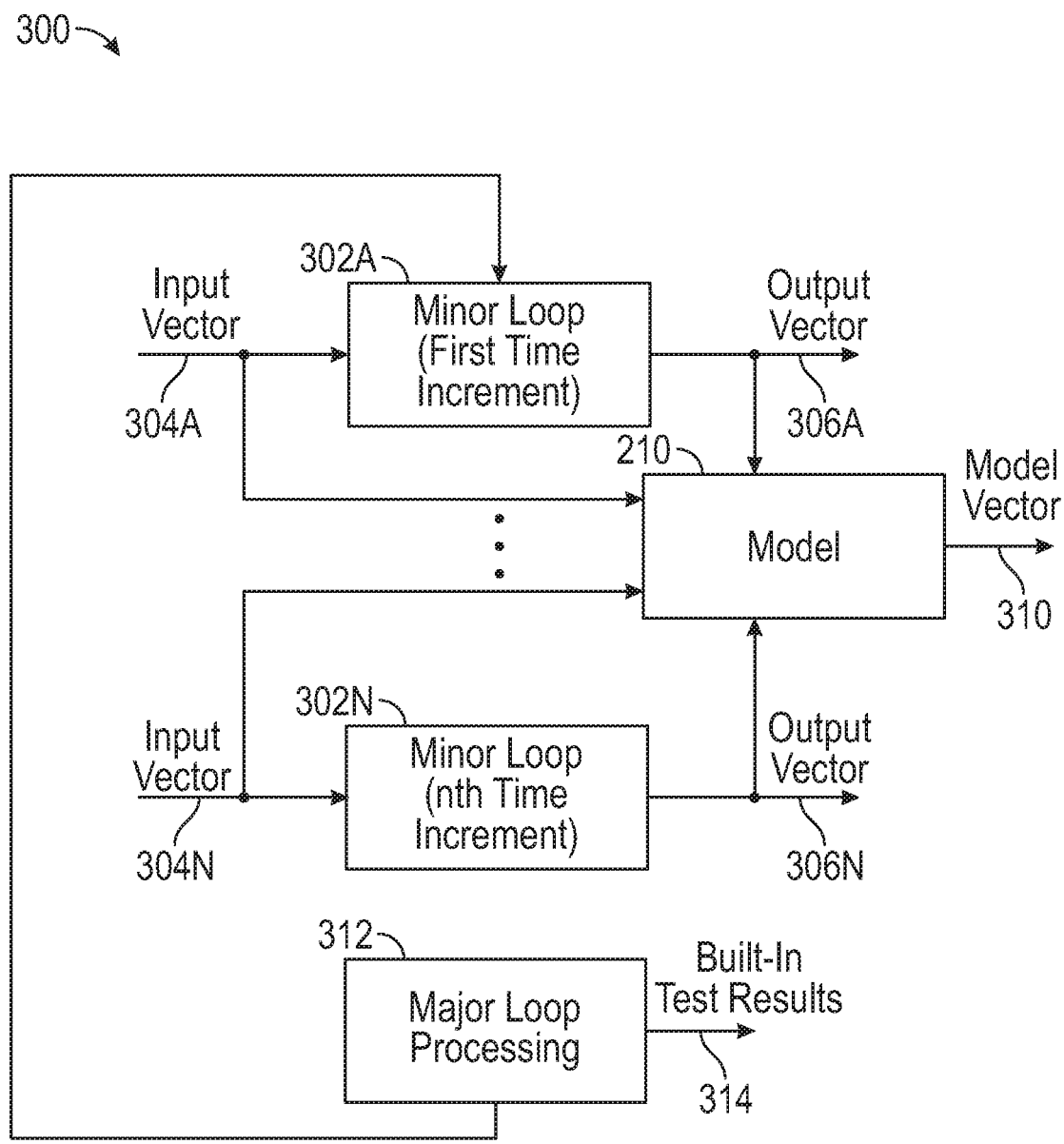
FIG. 4 depicts a block diagram of monitored control loops, in accordance with embodiments of the disclosure.

FIG. 4 depicts an example of monitored control loops 300 that may be part of the control logic 212 of FIG. 3. In the example of FIG. 4, the monitored control loops 300 can include a plurality of minor loops 302A-302N that are part of a major loop which can include separate major loop processing 312. For instance, at a first time increment, minor loop 302A can process input vector 304A to produce an output vector 306A, while at an nth time increment, minor loop 302N can process input vector 304N to produce an output vector 306N. The rate monitor 236 of FIG. 3 can verify that the minor loops 302A-302N are executing as expected according to the scheduling 216 of FIG. 3. The cyber monitor 205 can also monitor behavior of one or more control loops 300 of the controller 201 of FIG. 3 to verify proper operation. As one example, the cyber monitor 205 can interface with the model 210 to analyze a model vector 310 that can receive input vectors 304A-304N and examine one or more of the inputs derived from redundant sensors, related input/output signals, and output vectors 306A-306N. Related input/output signals can be received at the cyber monitor 205 from the model 210 of the controlled system 100 configured to derive a model vector 310 based on one or more input vectors 304A-304N, one or more output vectors 306A-306N, and one or more laws of physics associated with operation of the controlled system 100. Built-in test results 314, for instance, from major loop processing 312, as part of built-in test 220 of FIG. 3, can also be provided to the cyber monitor 205.

Figure 5:
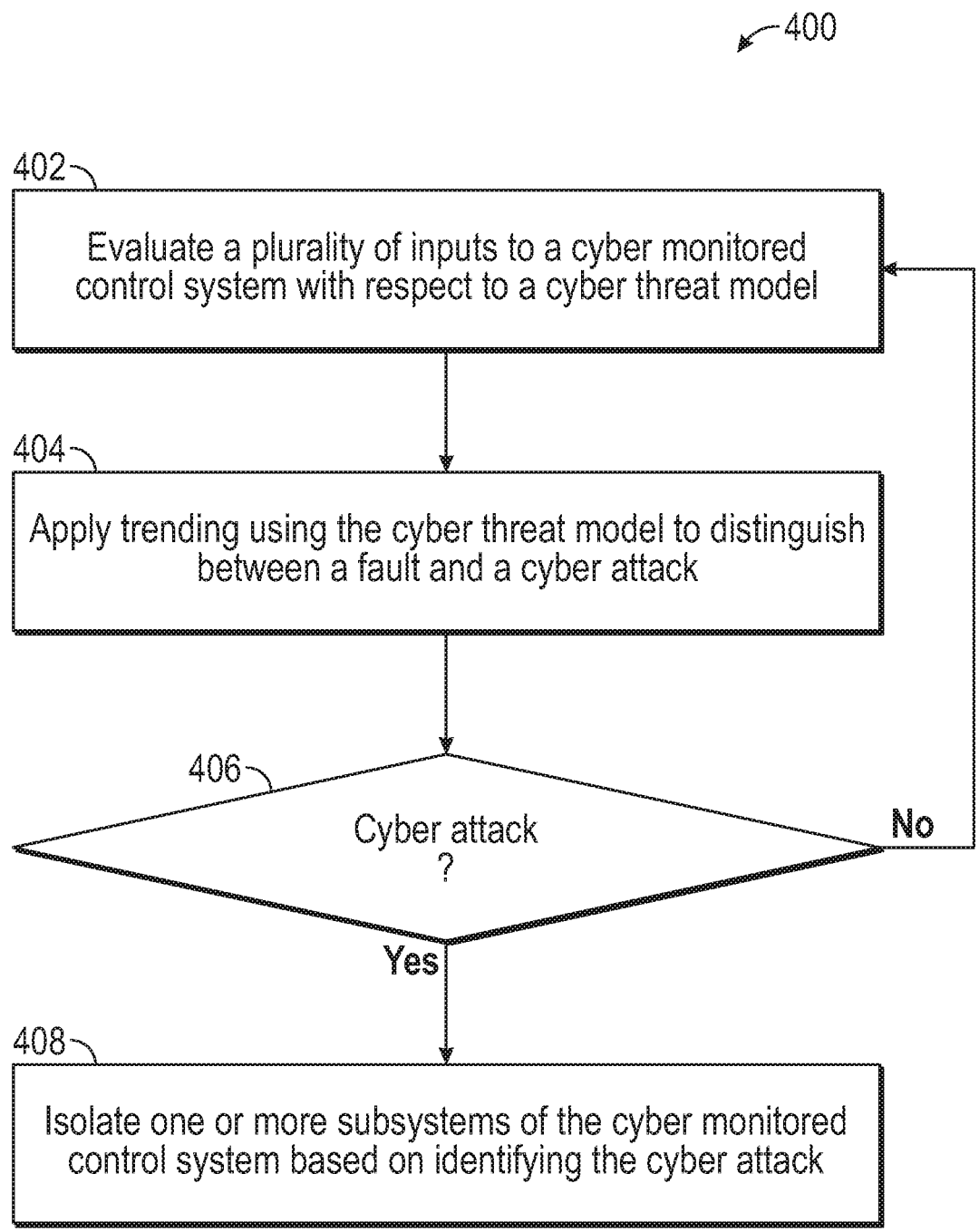
FIG. 5 is a flow chart illustrating a method, in accordance with an embodiment of the disclosure.

Referring now to FIG. 5 with continued reference to FIGS. 1-4, FIG. 5 is a flow chart illustrating a method 400 for cyber monitoring of a vehicle control system, in accordance with an embodiment. The method 400 may be performed, for example, by the analysis system 122 of FIG. 1, which may be local to or remote from the controlled system 100 of FIG. 2. At block 402, the cyber monitor 205 evaluates a plurality of inputs to a cyber monitored control system 101 with respect to a cyber threat model 230. The controlled system 100 can be, for instance, the gas turbine engine 20 of FIG. 1 or another vehicle system. The cyber threat model 230 can be trained, for instance, using artificial intelligence to adapt as one or more cyber threats are characterized. At block 404, the cyber monitor 205 applies trending 232 using the cyber threat model 230 to distinguish between a fault and a cyber attack. At block 406, the cyber monitor 205 can determine whether a cyber attack has been identified, and if not, the method 400 returns to block 402. At block 408, one or more subsystems of the cyber monitored control system 101 can be isolated based on identifying the cyber attack. Isolation can include disabling one or more sensors, communication buses, outputs, and/or other interfaces under a cyber attack.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cyber monitored control system comprising:
a controller comprising a first processing resource of a processing system operable to execute a control application for a controlled system; and
a cyber monitor comprising a second processing resource of the processing system isolated from the first processing resource in processing circuitry and in separate sections of a memory system of the processing system, the cyber monitor operable to:
evaluate a plurality of inputs of the controller with respect to a cyber threat model;
receive a plurality of built-in test results of diagnostics executed by the control application and configured to detect a problem within the processing system;
apply trending using the cyber threat model to distinguish between a fault and a cyber attack, wherein the cyber threat model comprises a plurality of rules and/or characteristics that are indicative of the cyber attack;
isolate one or more subsystems of the cyber monitored control system based on identifying the cyber attack;
wherein the cyber monitoring system is coupled to a sensor system, and the cyber monitor is operable to compare a plurality of raw input data received from the sensor system with conversion logic outputs of the controller to verify conversion logic performance of the controller; and
the controller is implemented using one or more hardware processors.

2. The cyber monitoring system of claim 1, wherein the inputs comprise one or more sensor inputs.

3. The cyber monitoring system of claim 2, wherein one or more of the inputs are derived from redundant sensors and related input/output signals.

4. The cyber monitoring system of claim 3, wherein the related input/output signals are received from a model of the controlled system configured to derive a model vector based on one or more input vectors, one or more output vectors, and one or more laws of physics associated with operation of the controlled system.

5. The cyber monitoring system of claim 4, wherein trending identifies inconsistent behavior that does not match a known fault mode or an expected result from the model of the controlled system as a probable cyber attack.

6. The cyber monitoring system of claim 1, wherein the cyber threat model is trained using artificial intelligence to adapt as one or more cyber threats are characterized.

7. The cyber monitoring system of claim 1, wherein the cyber monitor is operable to verify one or more update rates of the controller and monitor behavior of one or more control loops of the controller.

8. The cyber monitoring system of claim 1, wherein the cyber monitor is updateable through a cyber monitor update process comprising one or more security controls that are independent of an update process of the controller.

9. The cyber monitoring system of claim 1, wherein the cyber monitor is operable to track one or more communication anomalies and isolate a communication interface associated with the one or more communication anomalies based on identifying the cyber attack.

10. A method comprising:
evaluating, by a cyber monitor, of a cyber monitored control system, a plurality of inputs of a controller of the cyber monitored control system with respect to a cyber threat model, the controller comprising a first processing resource of a processing system operable to execute a control application for a controlled system and the cyber monitor comprising a second processing resource isolated from the first processing resource in processing circuitry and in separate sections of a memory system of the processing system;
receiving a plurality of built-in test results of diagnostics executed by the control application and configured to detect a problem within the processing system;
applying trending, by the cyber monitor, using the cyber threat model to distinguish between a fault and a cyber attack, wherein the cyber threat model comprises a plurality of rules and/or characteristics that are indicative of the cyber attack;
isolating one or more subsystems of the cyber monitored control system based on identifying the cyber attack;
wherein the cyber monitoring system is coupled to a sensor system and further comprising: comparing, by the cyber monitor, a plurality of raw input data received from the sensor system with conversion logic outputs of the controller to verify conversion logic performance of the controller; and
the controller is implemented using one or more hardware processors.

11. The method of claim 10, wherein the inputs comprise one or more sensor inputs.

12. The method of claim 11, wherein one or more of the inputs are derived from redundant sensors and related input/output signals.

13. The method of claim 12, further comprising:
receiving the related input/output signals from a model of the controlled system configured to derive a model vector based on one or more input vectors, one or more output vectors, and one or more laws of physics associated with operation of the controlled system.

14. The method of claim 13, wherein trending identifies inconsistent behavior that does not match a known fault mode or an expected result from the model of the controlled system as a probable cyber attack.

15. The method of claim 10, further comprising:
training the cyber threat model using artificial intelligence to adapt as one or more cyber threats are characterized.

16. The method of claim 10, further comprising:
verifying, by the cyber monitor, one or more update rates of the controller; and
monitoring, by the cyber monitor, behavior of one or more control loops of the controller.

17. The method of claim 10, wherein the cyber monitor is updateable through a cyber monitor update process comprising one or more security controls that are independent of an update process of the controller.

18. The method of claim 10, further comprising:
tracking, by the cyber monitor, one or more communication anomalies and isolate a communication interface associated with the one or more communication anomalies based on identifying the cyber attack.

* * * * *